Mar. 6, 1923.                                               1,447,617
                    R. HERRMANN
        PROCESS FOR THE MANUFACTURE OF PLATES FOR SORTERS
                   Filed July 6, 1921
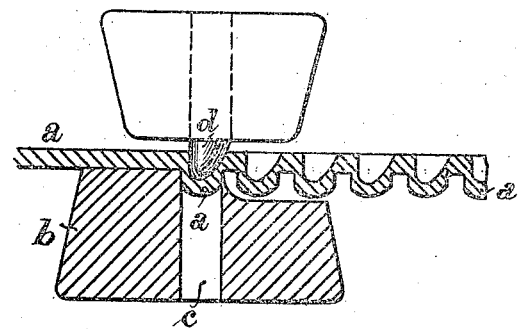
Inventor:-
Rudolf Herrmann
by attorneys Patented Mar. 6, 1923.

1,447,617

UNITED STATES PATENT OFFICE.

RUDOLF HERRMANN, OF DRESDEN, SAXONY, GERMANY.

PROCESS FOR THE MANUFACTURE OF PLATES FOR SORTERS.

Application filed July 6, 1921. Serial No. 482,843.

*To all whom it may concern:*

Be it known that I, RUDOLF HERRMANN, manufacturer, a subject of the Republic of Saxony, German Republic, and resident of 33 Zwichauer-Strasse, Dresden, Republic of Saxony, German Republic, have invented a new and useful Process for the Manufacture of Plates for Sorters (for which I have filed applications in Germany, application of August 16th, 1915; Austria, application of August 27th, 1915; Hungary, application of August 31, 1915; Tschecho-Slovakia, application of Oct. 25, 1919; Belgium, application of June 22, 1920; France, application of June 30, 1920), of which the following is a specification.

The present invention has for its object a process for the manufacture of plates for sorters.

The process for the manufacture of plates for sorters well known up to the present by cutting in the plate is performed in such a manner that the plate of relatively large thickness is cut in from above by a punch and the cut portion is hereafter formed into the shape of a cell by pressing it in a downward direction into a die provided with an opening.

In this procedure however the diameter of the opening provided in the die is and must be larger than that of the cutting punch for the reason that the cut portion is only pressed through in a downward direction by the punch mentioned without cutting the plate from below. This fact is accompanied by the drawback that the cells are not situated very closely one aside another, whereby the efficiency of the sorter-plate is reduced.

Now, according to the present invention the manufacture of the cells provided with sharp edges is performed in hard and relatively thin plates in such a manner that a punch co-acts with a die the opening of which is of a diameter approximately equal to that of the punch and provided with a border acting as a sharp cutting edge. Consequently the relatively thin plate is only cut in from below while the plate is punched under pressure. In this manner and in comparison with the process mentioned above an advantage is obtained which allows to use hard plates of small thickness and to produce cells of larger depth and with throughout sharp edges and fully closed bottom. Furthermore the cells can be punched as near as possible one aside another so as to increase the efficiency of the sorter-plate and ensure a good utility for a long period.

The drawing annexed to the description shows the manufacture of a sorter-plate of hard material according to the present invention.

The die $b$ used as a support for the plate $a$ which consists for example of iron and is to be provided with cells has an aperture or opening $c$, the diameter of which is nearly equal to the upper diameter of the cells to be produced so that, when the cells are pressed in by the punch $d$ the plate-fibres surrounding the cell during its formation are not also pressed through in a downward direction on the upper side of the plate, but only the bottom of the cell is pressed into the opening $c$, while cutting in the plate on all edges of the opening mentioned.

In this manner a cell of considerable depth and provided with a throughout sharp edge and a bottom cut in but at the same time fully closed is obtained.

What I claim is:

A process for the manufacture of sorter plates, consisting of the formation of cells in a relatively thin plate, each of said cells having a sharp edge, by subjecting the plate to the action of punches and dies, the diameter of each of said dies being substantially equal to that of its punch, said dies being provided with a sharp peripheral edge for cutting the side of the plate adjacent thereto.

In testimony, that I claim the foregoing as my invention, I have signed my name in presence of two witnesses, this fourth day of June, 1921.

RUDOLF HERRMANN.

Witnesses:
OTTO BRESDORF,
JOHANN PUEKERT.